United States Patent [19]

Parker

[11] Patent Number: 4,656,203
[45] Date of Patent: Apr. 7, 1987

[54] FRICTION MATERIALS AND THEIR MANUFACTURE

[75] Inventor: Euan Parker, Smithville, Tenn.

[73] Assignee: Turner & Newall Plc, Manchester, England

[21] Appl. No.: 707,565

[22] Filed: Mar. 4, 1985

[30] Foreign Application Priority Data

Oct. 20, 1984 [GB] United Kingdom ............... 8426601

[51] Int. Cl.$^4$ .................. C08J 5/14; C08K 7/02; C08L 61/06; F16D 69/00
[52] U.S. Cl. ........................ 523/155; 192/107 M; 523/152; 523/156; 525/58; 525/142; 525/144; 525/429
[58] Field of Search ............... 523/149, 155, 156, 152, 523/153; 192/107 M; 525/429, 427, 502, 134, 142, 144, 58

[56] References Cited

U.S. PATENT DOCUMENTS

| 4,118,528 | 10/1978 | Lowry | 192/107 M |
| 4,349,595 | 9/1982 | Trainor et al. | 192/107 M |
| 4,374,059 | 2/1983 | Wagner | 523/155 |
| 4,374,211 | 2/1983 | Gallagher et al. | 523/156 |
| 4,386,168 | 5/1983 | Fujimaki et al. | 523/155 |
| 4,403,047 | 9/1983 | Albertson | 523/155 |
| 4,465,796 | 8/1984 | Leroy et al. | 523/155 |
| 4,476,256 | 10/1984 | Hamermesh | 523/155 |
| 4,477,605 | 10/1984 | Okubo et al. | 523/155 |
| 4,508,855 | 4/1985 | Peters | 523/156 |

FOREIGN PATENT DOCUMENTS 1008801 11/1965 United Kingdom .

Primary Examiner—Allan M. Lieberman
Attorney, Agent, or Firm—Nixon & Vanderhye

[57] ABSTRACT

Low density friction products composed of non-asbestos reinforcing fibers embedded in a matrix of binder material, optionally including friction and wear modifiers, are described in which the actual density of the product is less than 72% of the theoretical density. Clutch facings of this density exhibit improved wear characteristics, lower inertia and increased burst strength.

23 Claims, 6 Drawing Figures

FRICTION MATERIALS AND THEIR MANUFACTURE

BACKGROUND OF THE INVENTION

This invention relates to friction materials and their manufacture, and more particularly to friction materials of the kind which are for dry running and which are molded.

Molded clutch facings are usually manufactured by subjecting an annular shaped preform containing a binder, reinforcing fibers, fillers and friction modifiers to the action of heat and pressure in a suitably shaped die. The binder, normally a thermosetting resin or vulcanizable elastomer or mixtures thereof, softens and flows to contact the reinforcing fibers and particles of filler or friction modifier then hardens under the continued application of heat and pressure. Alternatively, the preform may consist of a yarn or tape impregnated with a mixture of binders, fillers and friction modifiers and wound in a spiral or undulating pattern to produce an annular shape. The facings are usually die cured for periods of typically 4 minutes to 15 minutes and then may be further heated at temperatures of 150° C.–250° C. to complete the cure of the binder and also to improve friction properties.

Conventional friction materials molded from a mixture of asbestos fibers, thermosetting resins or vulcanizable elastomers or mixtures thereof and particulate fillers and friction modifiers are not normally consolidated to achieve the theoretical densities of the mixtures, i.e., they contain proportions of voids, even when cured at temperatures of up to 160° C. and pressures of up to 3 tons per square inch. The presence of voids, especially when interconnected to produce a permeable structure, is desirable to produce materials with good resistance to "fade", i.e., reduction in coefficient of friction when friction materials operate at high temperatures. Molded clutch facings comprising asbestos, a phenolformaldehyde resin binder, particulate fillers and friction modifiers are manufactured with densities typically in the range of 85–95% of theoretical density corresponding to void volumes of 15–5%.

When replacing asbestos fibers by fibers such as cellulose, glass, mineral wools (e.g., basalt or slagwools), alumino-silicate, polyacrylonitrile, polyamides, aromatic polyamides and carbon fibers, I have found that conventionally press cured materials are consolidated to greater percentages of their theoretical densities than are asbestos-based materials. This results in impermeable structures with very low void volumes. Such non-asbestos friction materials may possess good physical strengths but have poor resistance to fade and wear. Some improvement in fade resistance may be made by moulding or machining grooves into the working face of the friction material, but such improvements are not sufficient to match the performance of the best asbestos-based friction materials.

I have found that non-asbestos friction materials may be manufactured with high permeability with all its attendant advantages, and that the wear and fade properties of clutch facing may be remarkably improved thereby.

SUMMARY OF THE INVENTION

Thus the present invention provides a non-asbestos friction product such as a clutch facing made of reinforcing fibers embedded in a matrix of binder material, in which the actual density of the facing is less than 72% of the theoretical density of the facing.

The invention also provides a method for the manufacture of a non-asbestos clutch facing which comprises the steps of (1) mixing reinforcing fibers and curable binder material and, optionally, friction and wear modifiers, together, (2) forming a preform of this mixture in the rough shape of a clutch facing, and (3) heating and pressing this preform to compress it, without completely curing the binder material, and to consolidate the preform to an actual density less than 72% of the theoretical density and thereafter (4) completing cure of the binder under conditions of pressure such as to avoid any substantial further change in actual density.

The invention will be described with particular attention to clutch facings however other friction materials such as disk brake pads, brake linings and brake blocks will also benefit from the improvements herein described and are thus within the ambit of my invention.

BRIEF DESCRIPTION OF THE DRAWINGS

The invention will be further described with reference to the attached drawings in which:

FIG. 1 is an electron micrograph of a clutch facing of the conventional density of 96.2% of theoretical density;

FIG. 2 is an electron micrograph of a clutch facing according to the present invention having an actual density of 64.4% of theoretical.

DETAILED DESCRIPTION OF THE INVENTION

Figure 1A:
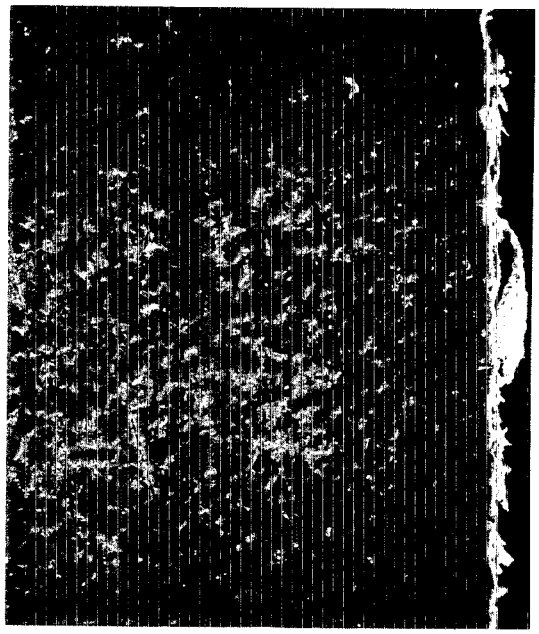
FIG. 1A is a cross-sectional view of clutch facing of conventional density at a magnification of 100x.
Figure 1B:
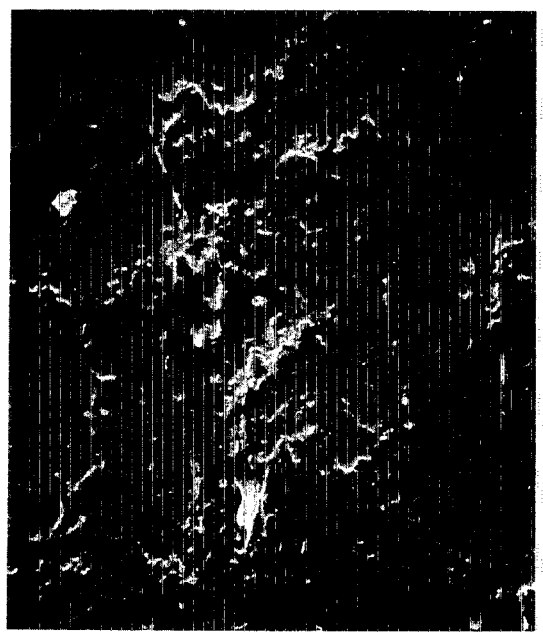
FIG. 1B is the same view as FIG. 2A at a magnification of 1,000x.
Figure 1C:
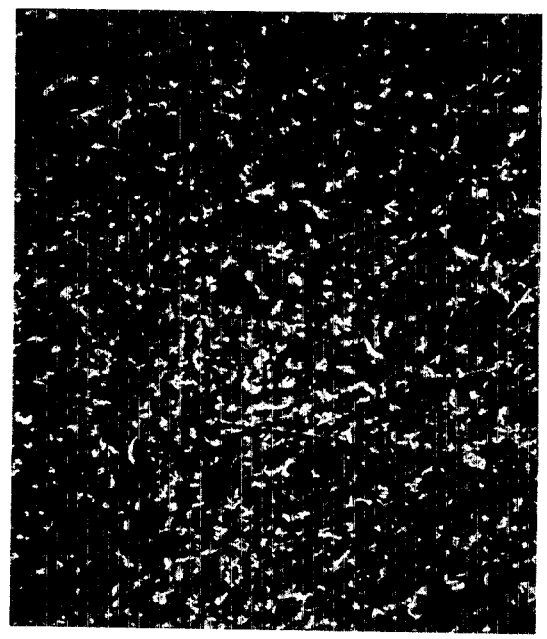
FIG. 1C is a surface view of a clutch facing of conventional density at a magnification of 50x.
Figure 2C:
FIG. 2C is a view of the surface of a clutch facing according to the present invention at a magnification of 50x.
Figure 2B:
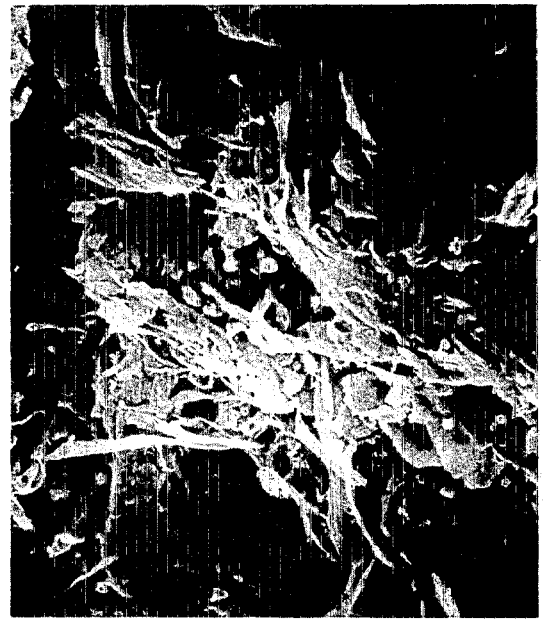
FIG. 2B is the same view as FIG. 2A at a magnification of 1,000x.
Figure 2A:
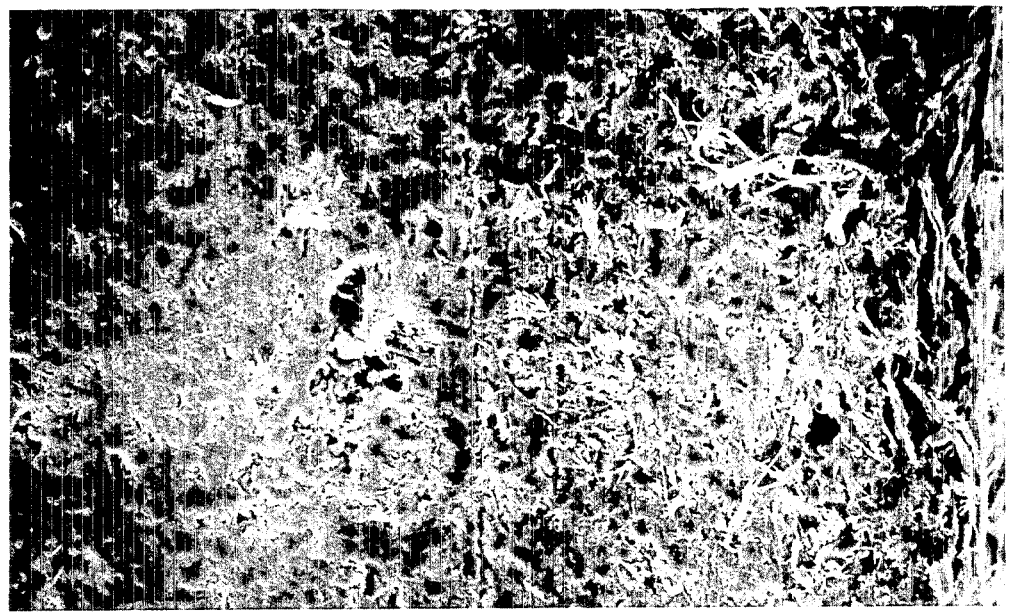
FIG. 2A is a cross-sectional view of a clutch facing of a density according to the present invention at a magnification of 100x.

The non-asbestos clutch facings according to the present invention incorporate reinforcing fibers which may be inorganic or organic or mixtures of fibers in which both types are present, the fibers being staple fibers which do not readily sub-divide into fibers of a smaller diameter and length. Typically the clutch facings may include fibers of glass, mineral wool, alumino-silicate, metals such as steel, cellulose, polyamides, particularly aromatic polyamides such as those available from DuPont under the trade mark KEVLAR ®, polyacrylonitrile, polyvinyl alcohol and so on. Although the length of fibers used is not critical it would generally be in the range 1–10 mm and preferably in the range of 1–4 mm for most purposes.

Mixtures of fibers may be particularly useful in providing a desired combination of properties. Preferred mixtures include glass or another mineral fiber such as alumino-silicate with an organic fiber such as cellulose, aromatic polyamide pulp or polyacrylonitrile, and mixtures of organic fibers such as aromatic polyamide pulp with polyacrylonitrile.

The amount of reinforcing fibers in the facings is preferably in the range of 10 to 60% by volume total solids and more preferably 20 to 30% by total volume of solids.

The binder material mentioned previously is preferably based on binder polymers usual for use in clutch facings. These binders are well known in the art and include resins based on phenol and formaldehyde and related resins, and rubbers such as nitrile rubbers, natural rubber and styrene-butadiene rubber. Mixtures of resin and rubber may be used, the particular combination of polymers chosen depending upon the manufacturing characteristics desired and properties wanted in the finished facing. The amount of binder polymers employed will generally be higher than would be conventional for the particular clutch facing being made, owing to the high volume of voids in the facings of the present invention. Amounts of binder polymers of at least 20% by volume up to as much as 75% by volume may be used, in the facings these figures being % by volume of total solids in the finished product and ignoring volume of voids in the product. Preferably the amount of resin binder falls in the range of about 35% to about 45% by volume total solids.

Friction and wear modifiers and fillers of the usual types may be employed, examples of such materials being carbon black, graphite, talc barytes, polymerized cashew nut shell resin particles, and metal powders, e.g., brass, copper and alumina alloys, metallic sulphides, metallic oxides, vermiculite. When present such modifiers are incorporated in the range of about 20% to about 30% by volume of total solids.

With respect to clutch facings, the actual density of the facing is less than 72% of the theoretical density of the facing and preferably the density is in the range of between about 68% and 64% of theoretical. At actual densities approaching 60% of theoretical and below structural integrity of the facing is apt to suffer and the facing is unsuitable for its intended purpose. One skilled in the manufacture of friction products will have no difficulty in empirically selecting the appropriate density having regard to the formulation used, the pressing-/heating conditions employed, and the intended use of the product.

It has been found that non-asbestos clutch facings of the present invention using the compositions outlined above may achieve significant reductions in wear rate when compared with conventional clutch facings made from asbestos, while they are also of lower weight for a given size and hence have lower inertia. Clutch facings with lower inertia make gear changing easier and cause less wear on the transmission's synchronizing mechanism.

The specific gravity of the facings made in this invention may be in the range 0.8 to 1.4 compared to a specific gravity of 1.6 or more for the usual commercially available clutch facings.

The invention will now be described, by way of example only, in the following detailed examples.

EXAMPLE 1

Annular clutch facings were made for comparison from a simple composition of resin and fiber which was as follows:

| | parts by weight |
|---|---|
| Phenol resin | 68 |
| Aromatic polyamide "pulp" fiber (KEVLAR ®) | 32 |

| | parts by weight |
|---|---|
| fiber length 6 mm | |

The theoretical density of this mix was 1.32 gms/cc.

The two components were thoroughly mixed together with water to form a slurry of about 12% by weight solids. The slurry was dispensed uniformly into an annular mold to form preforms.

Heating and pressing procedures: By the application of pressure to the mold some dewatering takes place via a top and bottom filter medium which form part of the mold. When a preform is reduced to about 30–40% by weight water content, it is removed from the mold and placed in an oven at about 150° F. to dry to under a 1% by weight water level. The dried preform is then placed between two hot mold plates in a hot press, both plates and press being maintained at about 300° F. Pressure is then applied the magnitude and rate of application of which determines the density and other properties of the final product. The pressure and length of time in the press, which will depend on the cure rate of the specific thermosetting resin used—typically 3–10 minutes—is chosen to achieve the desired theoretical density of the preform. After the pressing the pressure is relieved and the now partially cured facing removed. The facing is now further cured in an oven for about four hours at 400° F. The facing is then ground flat and parallel to the desired thickness and machined to the dimensions required for the particular application.

Testing procedures: The clutch facings produced were tested on an inertia dynamometer which represents an automotive clutch take-up or engagement. Specific conditions were chosen for a 200 mm outer diameter by 135 mm inner diameter by 35 mm thick facing which fits a Ford Escort clutch assembly mounted to the dynamometer. The conditions simulate aggressive first gear engagements at a normal clutch operating temperature of 260° F. measured 0.020 inch below the pressure plate surface. Work done by the clutch per engagement cycle is 13,738 Ft-Lb.

The relative facing-pressure plate angular velocity is reduced from 1800 RPM to zero in an approximately linear manner by controlling the clutch torque to a constant value of about 80 Lb-Ft. 2000 cycles comprise one test. Wear during the test is determined by measuring the thickness of the facing before and after the test in twenty-four places around the facing—this method has an error in wear measurement of typically ±0.002 inch.

Three samples of the above composition were molded to different densities in the manner described above and then tested:

A. Pressed to an actual density of 1.27 gms/cc—that is 96.2% of theoretical density.
B. Pressed to an actual density of 1.01 gms/cc—that is 76.5% of theoretical density.
C. Pressed to an actual density of 0.85 gms/cc—that is 64.4% of theoretical density.

The following results were obtained:

| % Of Theoretical Density | | Wear Per 2000 Cycles In Ins |
|---|---|---|
| A | 96.2 | 0.0073 |
| B | 76.5 | 0.0013 |

| % Of Theoretical Density | | Wear Per 2000 Cycles In Ins |
|---|---|---|
| C | 64.4 | 0.0004 |

Sample A: had a totally unacceptable wear rate.

Sample B: had a wear rate which was slightly better than, but comparable with, a typical state of the art asbestos-based clutch facing.

Sample C: in accordance with this invention, had a remarkably low wear rate.

EXAMPLE 2

Clutch facings were manufactured by the same procedure as used in Example 1 but using the following formulation:

| | parts by volume % solids | % by weight |
|---|---|---|
| Binder (Phenolic Resin) | 40 | 25 |
| Aramid Fiber (KEVLAR ® pulp) | 10 | 9 |
| Cellulose Fiber | 25 | 24 |
| Ceramic Fiber | 12 | 20 |
| Friction Modifiers | 13 | 22 |

In each case the facings were molded to a final density which was 65% of theoretical. The clutch facings produced were tested for wear by the same procedures as in Example 1, the wear per 2000 cycles expressed in inches being $1.64 \times 10^{-3}$.

The burst strengths of facings of various sizes were also measured, and found to be as follows:

| Facing size | Burst Strength (rpm) |
|---|---|
| 8" × 5" | 12,360 |
| 11" × 6.5" | 8,400 |
| 13.875" × 7.25" | 7,800 |

These burst strengths compare extremely favorably with those regarded as acceptable in the U.S. industry for facings of this size and show that the facings produced have both good strength and low density with good wear characteristics.

EXAMPLE 3

In this example, clutch facings were manufactured by the same procedure as used in Example 1 but using a formulation as follows:

| | parts by volume of solids | % by weight |
|---|---|---|
| Binder (Phenolic Resin) | 50 | 30 |
| Aramid Fiber (KEVLAR ® pulp) | 28 | 24 |
| Ceramic Fiber | 10 | 30 |
| Friction and Wear Modifiers | 12 | 16 |

Facings were molded to 67% of theoretical density. Wear rate of the facings was measured as in Example 1 and found to be $1.1 \times 10^{-3}$ inches per 2000 cycles which is extremely good.

The burst strengths of facings of various sizes were also measured and found to be as follows:

| Facing size | Burst Strength (rpm) |
|---|---|
| 8" × 5" | 14,500 |
| 11" × 6.5" | 10,075 |
| 13.875" × 7.25" | 9,480 |

In this case the burst strengths were particularly good and combined with excellent wear characteristics and other properties.

I claim:

1. A non-asbestos dry-running clutch facing comprising reinforcing fibers embedded in a matrix of binder material, in which specific gravity of the facing is not greater than 1.4 and the actual density of the facing is at least 60% but less than 72% of the theoretical density of the facing.

2. A clutch facing according to claim 1 in which the reinforcing fibers have lengths in the range of 1 mm to 10 mm.

3. A clutch facing according to claim 2 in which the reinforcing fibers have lengths in the range of 1 mm to 4 mm.

4. A clutch facing according to claim 1 in which the reinforcing fibers are selected from glass, mineral wool, alumino-silicate fibers, steel, cellulose, aromatic polyamides, polyacrylonitrile, polyvinyl alcohol and mixtures thereof.

5. A clutch facing according to claim 4 in which the amount of reinforcing fibers is in the range of 20 to 30 percent by volume total solids.

6. A clutch facing according to claim 1 in which the binder material comprises a temperature-resistant thermosetting resin.

7. A clutch facing according to claim 6 in which the binder material is a phenolic resin.

8. A clutch facing according to claim 5 in which the amount of binder material is in the range of 20 to 75 percent by volume total solids.

9. A clutch facing according to claim 8 in which the amount of binder material is in the range of 35 to 45 percent by volume total solids.

10. A clutch facing according to claim 1 further including at least one friction modifier, wear modifier or filler.

11. A clutch facing according to claim 10 in which the friction modifier, wear modifier or filler is present in an amount of from 20 to 30 percent by volume total solids.

12. A method for manufacturing a non-asbestos dry running clutch facing which comprises the steps of:
    (1) mixing together reinforcing fibers and curable binder material and, optionally, friction and wear modifiers;
    (2) forming the mixture of step (1) into a preform in the approximate shape of a clutch facing;
    (3) heating and pressing the preform to compress it without completely curing the binder material and consolidate the preform to an actual density is at least 60% but less than 72% of the theoretical density; and thereafter
    (4) completely curing the binder under conditions of pressure such as to avoid any substantial further change in actual density.

13. A method according to claim 12 in which the reinforcing fibers comprise fibers which are capable of forming a web when deposited from slurry, and in which the fibers and other materials are mixed together to form a slurry and forming said preform by deposition of the mixture from said slurry, the preform being subsequently dewatered and dried to a water content of below 1% by weight.

14. A method according to claim 12 in which the reinforcing fibers have lengths in the range of 1 mm to 10 mm.

15. A method according to claim 14 in which the reinforcing fibers have lengths in the range of 1 mm to 4 mm.

16. A method according to claim 12 in which the reinforcing fibers are selected from glass, mineral wool, alumino-silicate fibers, steel, cellulose, aromatic polyamides, polyacrylonitrile, polyvinyl alcohol and mixtures thereof.

17. A method according to claim 16 in which the amount of reinforcing fibers is in the range of 20 to 30 percent by volume total solids.

18. A method according to claim 17 in which the binder material comprises a temperature-resistant thermosetting resin.

19. A method according to claim 18 in which the binder material is a phenolic resin.

20. A method according to claim 12 in which the amount of binder material is in the range of 20 to 75 percent by volume total solids.

21. A method according to claim 20 in which the amount of binder material is in the range of 35 to 45 percent by volume total solids.

22. A method according to claim 12 further including at least one friction modifier, wear modifier or filler.

23. A method according to claim 22 in which the friction modifier, wear modifier or filler is present in an amount of from 20 to 30 percent by volume total solids.

* * * * *